US 6,722,758 B2

(12) United States Patent
Silverbrook et al.

(10) Patent No.: US 6,722,758 B2
(45) Date of Patent: Apr. 20, 2004

(54) INTEGRATED PRINT ENGINE AND PAPER MOVEMENT SYSTEM (75) Inventors: Kia Silverbrook, Balmain (AU); Tobin Allen King, Balmain (AU); Garry Raymond Jackson, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 10/309,242

(22) Filed: Dec. 4, 2002

(65) Prior Publication Data

US 2003/0063180 A1 Apr. 3, 2003

Related U.S. Application Data (63) Continuation of application No. 09/608,779, filed on Jun. 30, 2000.

(51) Int. Cl.⁷ .................................................. B41J 2/165
(52) U.S. Cl. ........................................ 347/32; 347/104
(58) Field of Search ............................ 347/29, 32, 104

(56) References Cited

U.S. PATENT DOCUMENTS 5,682,186 A * 10/1997 Bohorquez et al. ........... 347/29
6,471,331 B1 * 10/2002 Silverbrook et al. .......... 347/32

* cited by examiner

Primary Examiner—Thinh Nguyen
Assistant Examiner—Julian Huffman (57) ABSTRACT

A capping mechanism for a print engine includes a capping member mountable in alignment with a printhead of the print engine. The capping member is displaceable into and out of abutment with the printhead for capping and uncapping the printhead respectively. A torsion bar arrangement acts on the capping member for displacing the capping member. A mechanical displaceable element co-operates with the torsion bar arrangement such that, when the element is in a parked position, the element engages the torsion bar arrangement to cause the capping member to be displaced into abutment with the printhead to cap the printhead. When the displaceable element is out of its parked position, the capping member is urged by the torsion bar arrangement out of abutment with the printhead.

14 Claims, 14 Drawing Sheets

INTEGRATED PRINT ENGINE AND PAPER MOVEMENT SYSTEM

Continuation application of U.S. Ser. No. 09/608,779 date Jun. 30, 2000

FIELD OF THE INVENTION

This invention relates to a print engine. The invention has particular application in a print engine for use in an instantaneous print, digital camera. More particularly, the invention relates to a capping mechanism for such a print engine.

BACKGROUND TO THE INVENTION

It is desirable to make digital cameras as compact as possible so that it is easier to carry such cameras around. One of the ways of making the camera compact is to reduce the size of the power source. It will be appreciated that, normally, the power source will be a battery pack and to reduce the size of the battery pack, for example by using fewer batteries, would result in a more compact camera.

In order to do so, it is desirable to omit high power consumption components from the camera and, more particularly, its print engine.

SUMMARY OF THE INVENTION

According to the invention, there is provided a capping mechanism for a print engine, the capping mechanism including a capping means mountable in alignment with a printhead of the print engine, the capping means being displaceable into and out of abutment with the printhead for capping and uncapping the printhead, respectively;

an urging means which acts on the capping means for displacing the capping means; and a mechanical displaceable element which co-operates with the urging means such that, when the element is in a parked position, the element engages the urging means to cause the capping means to be displaced into abutment with the printhead to cap the printhead and, when the displaceable element is out of its parked position, the capping means is urged by the urging means out of abutment with the printhead.

The printhead is, preferably, a page width printhead, the capping means including a rib of a resiliently flexible material to abut against the printhead when the capping means is in a capping position. By "page width" is meant that the printhead prints one line at a time on the print media without traversing the print media, or rastering, as the print media moves past the printhead.

The rib may be carried on a carrier. Then, the urging means may act on the carrier.

The urging means may include an elongate element which is held captive in the carrier and a biasing means acting on the elongate element for biasing the urging means and, hence, the capping means to an uncapped position.

The elongate element may comprise a torsion bar arrangement having an arm at each end.

The mechanical displaceable element may be a separating means, such as a cutter wheel, which separates a piece of print media, after printing of an image by the print engine on the piece of print media, from a supply of the print media. The separating means may be displaceable in a direction parallel to the printhead and the separating means may include an engaging means which engages one of the arms of the torsion bar arrangement, when the separating means is in its parked position, to urge the arm against the action of the biasing means to drive the capping mechanism into its capped position.

The engaging means may be a cam member carried by the separating means. More particularly, the cutter wheel may be carried on a mounting block, which is driven by a worm gear to traverse the printhead. Then the mounting block may include the cam member such that, when the mounting block is moved to its parked position, the cam member engages the arm of the torsion bar arrangement for displacing the torsion bar arrangement, against the action of the biasing means, such that the capping mechanism is urged into abutment with the printhead.

BRIEF DESCRIPTION OF THE DRAWINGS

The invention will now be described by way of example with reference to the accompanying diagrammatic drawings in which.

DETAILED DESCRIPTION OF THE DRAWINGS

In the drawings, reference numeral 500 generally designates a print engine, in accordance with the invention. The print engine 500 includes a print engine assembly 502 on which a print roll cartridge 504 is removably mountable.

The print cartridge 504 is a receptacle containing consumables such as a supply of print media and various types of ink. The print cartridge 504 is described in greater detail in our co-pending applications entitled "A Print Cartridge" and "An Ink Cartridge" filed simultaneously herewith as U.S. Ser. Nos. 09/607,993 and 09/607,251 respectively, the contents of that disclosure being specifically incorporated herein by reference.

The print engine assembly 502 comprises a first sub-assembly 506 and a second, printhead sub-assembly 508.

Figure 5:
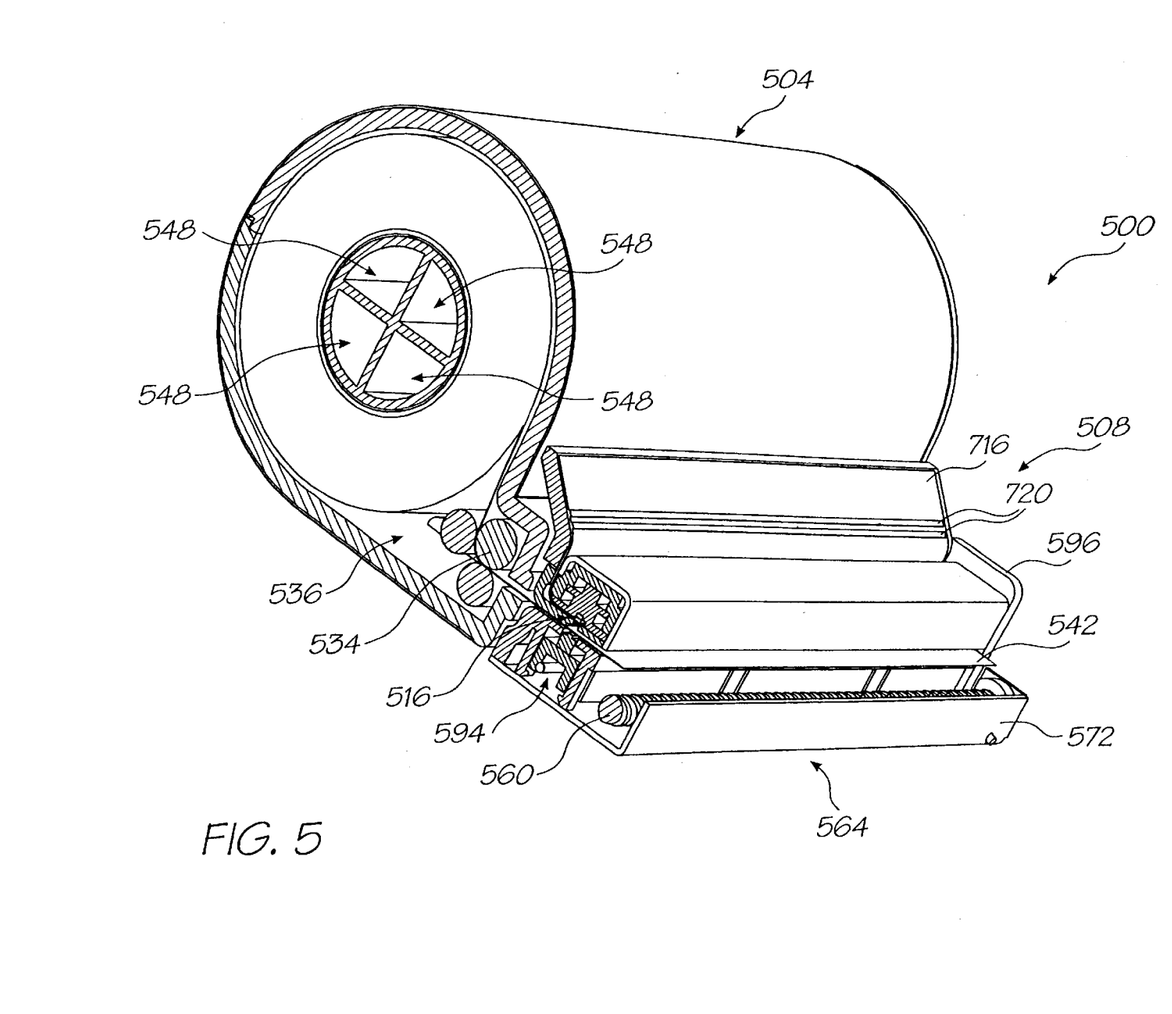
FIG. 5 shows a three dimensional, sectional view of the print engine.
Figure 6:
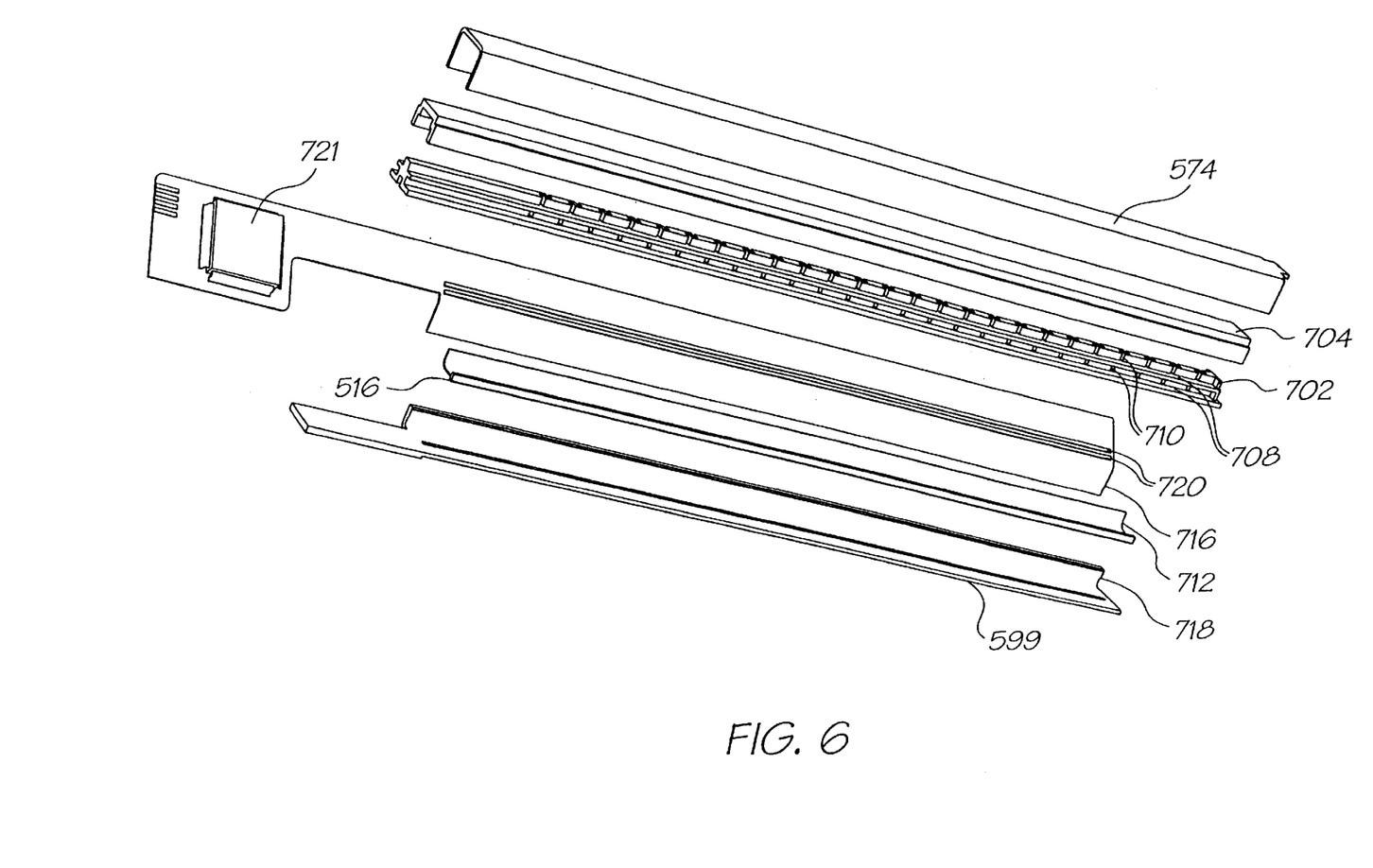
FIG. 6 shows a three dimensional, exploded view of a printhead sub-assembly of the print engine.

The sub-assembly 506 includes a chassis 510. The chassis 510 comprises a first molding 512 in which ink supply channels 514 are molded. The ink supply channels 514 supply inks from the print cartridge 504 to a printhead 516 (FIGS. 5 to 7) of the printhead sub-assembly 508. The printhead 516 prints in four colors or three colors plus ink which is visible in the infrared light spectrum only (hereinafter referred to as 'infrared ink'). Accordingly, four ink supply channels 514 are defined in the molding 512 together with an air supply channel 518. The air supply channel 518 supplies air to the printhead 516 to inhibit the build up of foreign particles on a nozzle guard of the printhead 516.

The chassis 510 further includes a cover molding 520. The cover molding 520 supports a pump 522 thereon. The pump 522 is a suction pump, which draws air through an air filter in the print cartridge 504 via an air inlet pin 524 and an air inlet opening 526. Air is expelled through an outlet opening 528 into the air supply channel 518 of the chassis 510.

Figure 1:
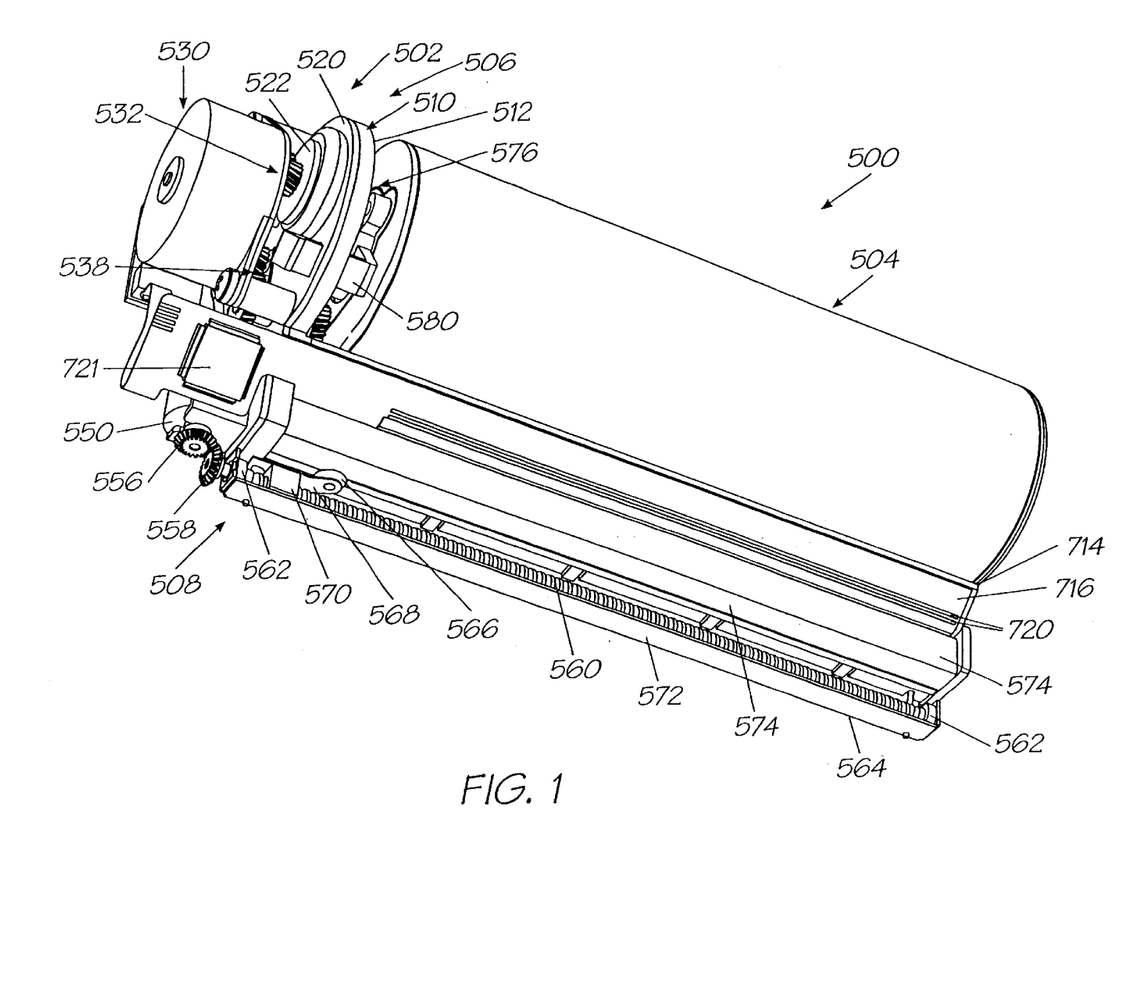
FIG. 1 shows a three dimensional view of a print engine, including components in accordance with the invention.
Figure 2:
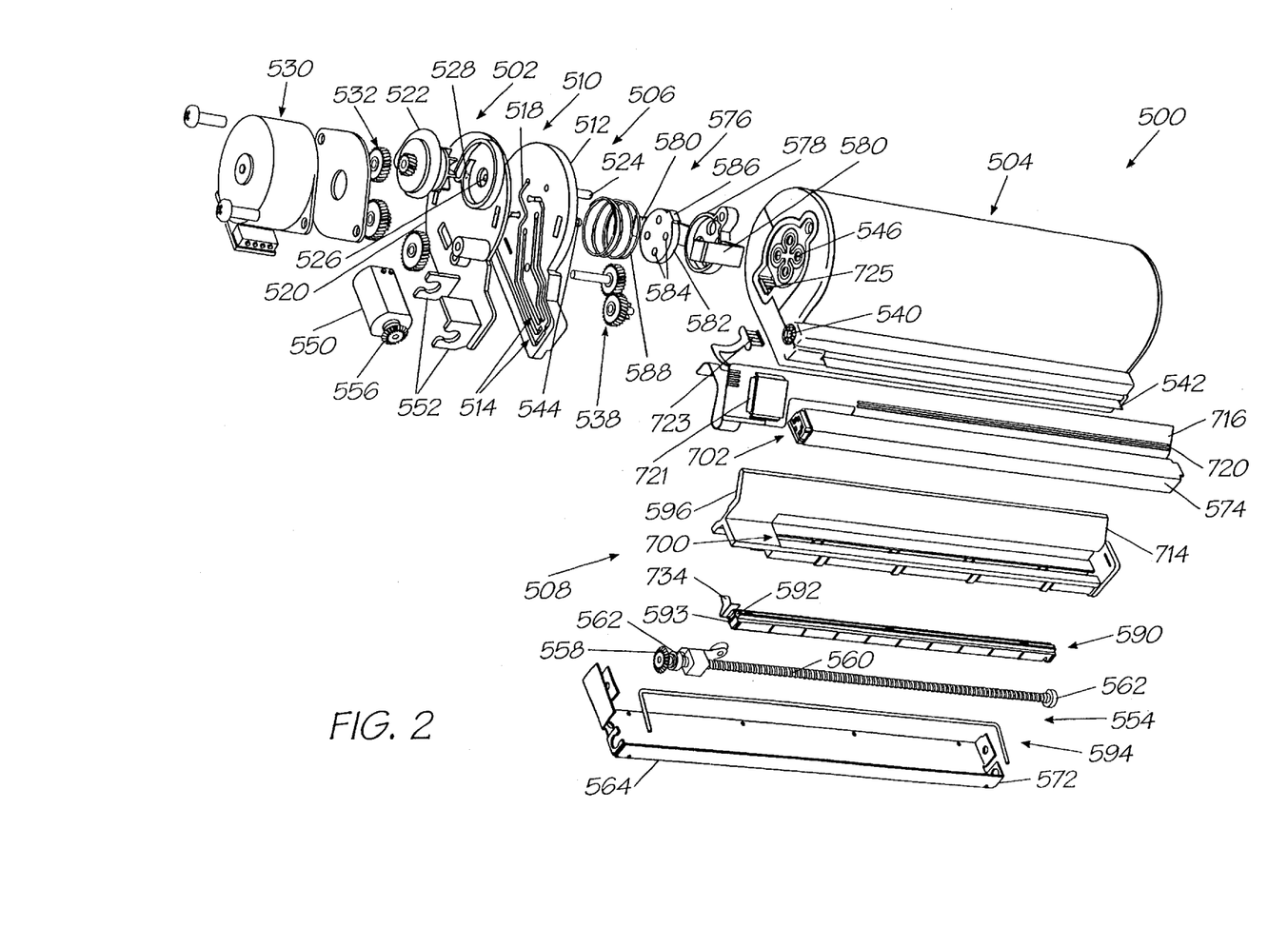
FIG. 2 shows a three dimensional, exploded view of the print engine.

The chassis 510 further supports a first drive motor in the form of a stepper motor 530. The stepper motor 530 drives the pump 522 via a first gear train 532. The stepper motor 530 is also connected to a drive roller 534 (FIG. 5) of a roller assembly 536 of the print cartridge 504 via a second gear train 538. The gear train 538 engages an engagable element 540 (FIG. 2) carried at an end of the drive roller 534. The stepper motor 530 thus controls the feed of print media 542 to the printhead 516 of the sub-assembly 508 to enable an image to be printed on the print media 542 as it passes beneath the printhead 516. It also to be noted that, as the stepper motor 530 is only operated to advance the print media 542, the pump 522 is only operational to blow air over the printhead 516 when printing takes place on the print media 542.

The molding 512 of the chassis 510 also supports a plurality of ink supply conduits in the form of pins 544 which are in communication with the ink supply channels 514. The ink supply pins 544 are received through an elastomeric collar assembly 546 of the print cartridge 504 for drawing ink from ink chambers or reservoirs 548 (FIG. 5) in the print cartridge 504 to be supplied to the printhead 516.

A second motor 550, which is a DC motor, is supported on the cover molding 520 of the chassis 510 via clips 552. The motor 550 is provided to drive a separating means in the form of a cutter arm assembly 554 to part a piece of the print media 542, after an image has been printed thereon, from a remainder of the print media. The motor 550 carries a beveled gear 556 on an output shaft thereof. The beveled gear 556 meshes with a beveled gear 558 carried on a worm gear 560 of the cutter assembly 554. The worm gear 560 is rotatably supported via bearings 562 in a chassis base plate 564 of the printhead sub-assembly 508.

The cutter assembly 554 includes a cutter wheel 566, which is supported on a resiliently flexible arm 568 on a mounting block 570. The worm gear 560 passes through the mounting block 570 such that, when the worm gear 560 is rotated, the mounting block 570 and the cutter wheel 566 traverse the chassis base plate 564. The mounting block 570 bears against a lip 572 of the base plate 564 to inhibit rotation of the mounting block 570 relative to the worm gear 560. Further, to effect cutting of the print media 542, the cutter wheel 566 bears against an upper housing or cap portion 574 of the printhead sub-assembly 508. This cap portion 574 is a metal portion. Hence, as the cutter wheel 566 traverses the capped portion 574, a scissors-like cutting action is imparted to the print media to separate that part of the print media 542 on which the image has been printed.

The sub-assembly 506 includes an ejector mechanism 576. The ejector mechanism 576 is carried on the chassis 510 and has a collar 578 having clips 580, which clip and affix the ejector mechanism 576 to the chassis 510. The collar 578 supports an insert 582 of an elastomeric material therein. The elastomeric insert 582 defines a plurality of openings 584. The openings 584 close off inlet openings of the pins 544 to inhibit the ingress of foreign particles into the pins 544 and, in so doing, into the channels 514 and the printhead 516. In addition, the insert 584 defines a land or platform 586 which closes off an inlet opening of the air inlet pin 524 for the same purposes.

Figure 3:
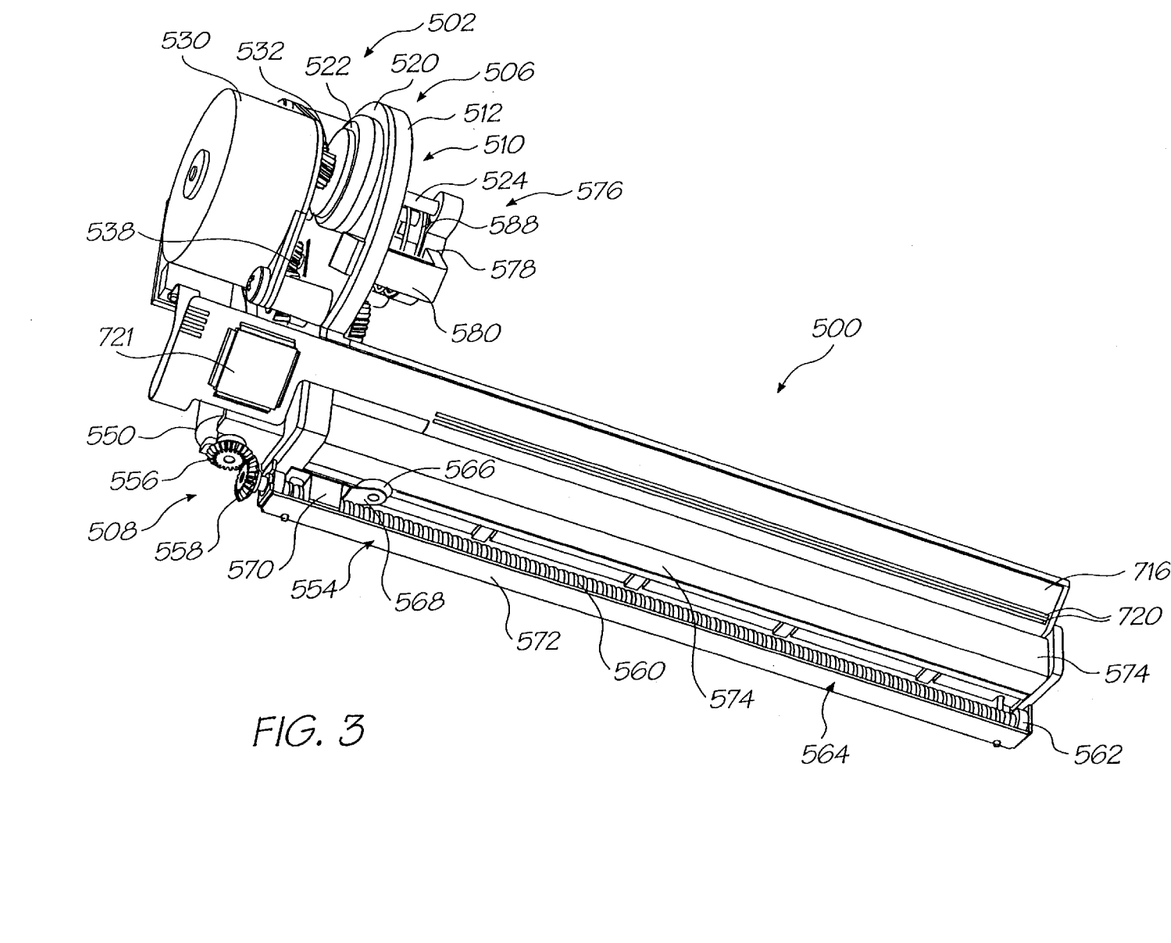
FIG. 3 shows a three dimensional view of the print engine with a removable print cartridge used with the print engine removed.
Figure 4:
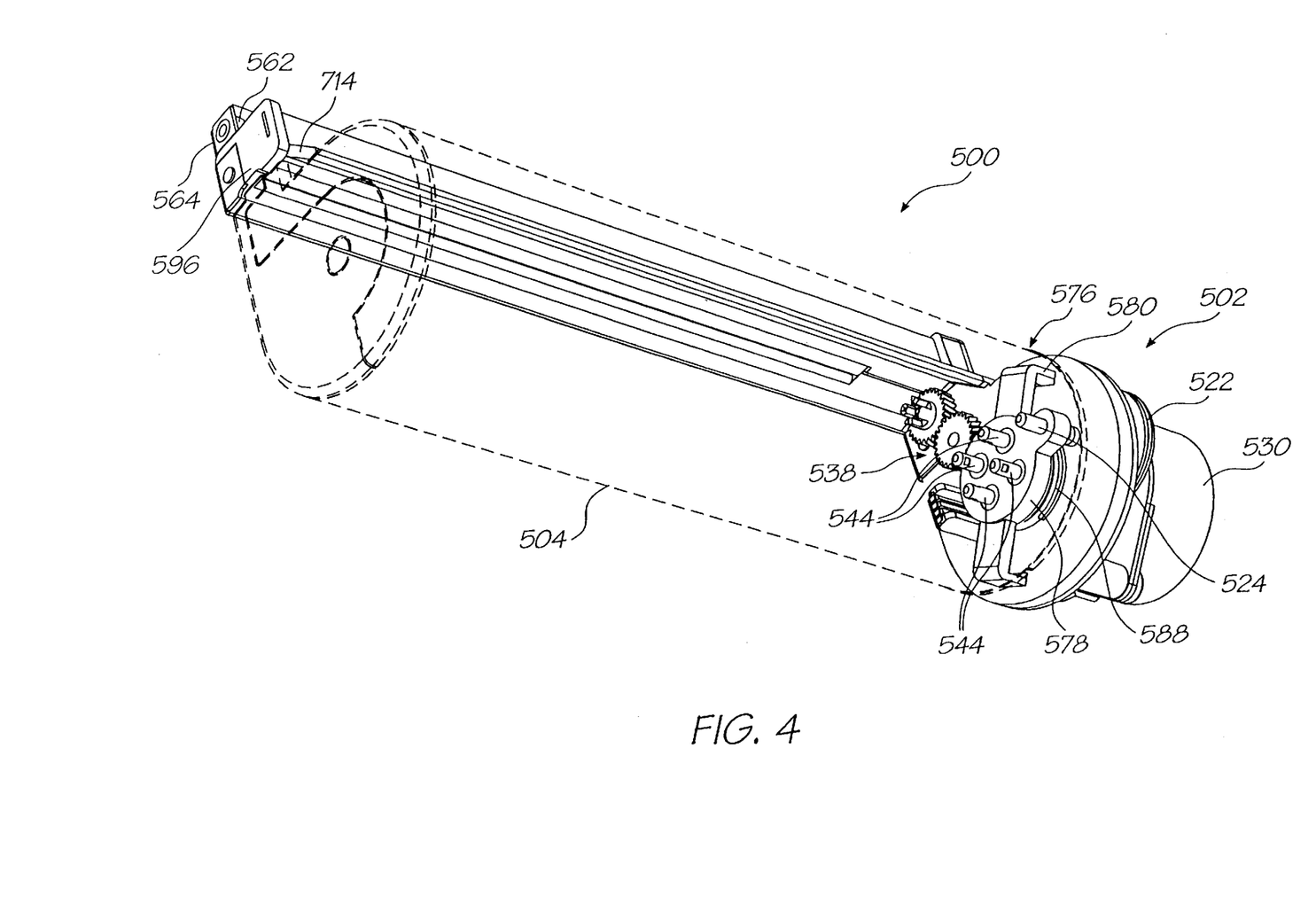
FIG. 4 shows a three dimensional, rear view of the print engine with the print cartridge shown in dotted lines.

A coil spring 588 is arranged between the chassis 510 and the collar 578 to urge the collar 578 to a spaced position relative to the chassis 510 when the cartridge 504 is removed from the print engine 500, as shown in greater detail in FIG. 3 of the drawings. The ejector mechanism 576 is shown in its retracted position in FIG. 4 of the drawings.

The printhead sub-assembly 508 includes, as described above, the base plate 564. A capping mechanism 590 is supported displaceably on the base plate 564 to be displaceable towards and away from the printhead 516. The capping mechanism 590 includes an elongate rib 592 arranged on a carrier 593. The carrier is supported by a displacement mechanism 594, which displaces the rib 592 into abutment with the printhead 516 when the printhead 516 is inoperative. Conversely, when the printhead 516 is operational, the displacement mechanism 594 is operable to retract the rib 592 out of abutment with the printhead 516.

The printhead sub-assembly 508 includes a printhead support molding 596 on which the printhead 516 is mounted. The molding 596, together with an insert 599 arranged in the molding 596, defines a passage 598 through which the print media 542 passes when an image is to be printed thereon. A groove 700 is defined in the molding 596 through which the capping mechanism 590 projects when the capping mechanism 590 is in its capping position.

An ink feed arrangement 702 is supported by the insert 599 beneath the cap portion 574. The ink feed arrangement 702 comprises a spine portion 704 and a casing 706 mounted on the spine portion 704. The spine portion 704 and the casing 706, between them, define ink feed galleries 708 which are in communication with the ink supply channels 514 in the chassis 510 for feeding ink via passages 710 (FIG. 7) to the printhead 516.

Figure 8:
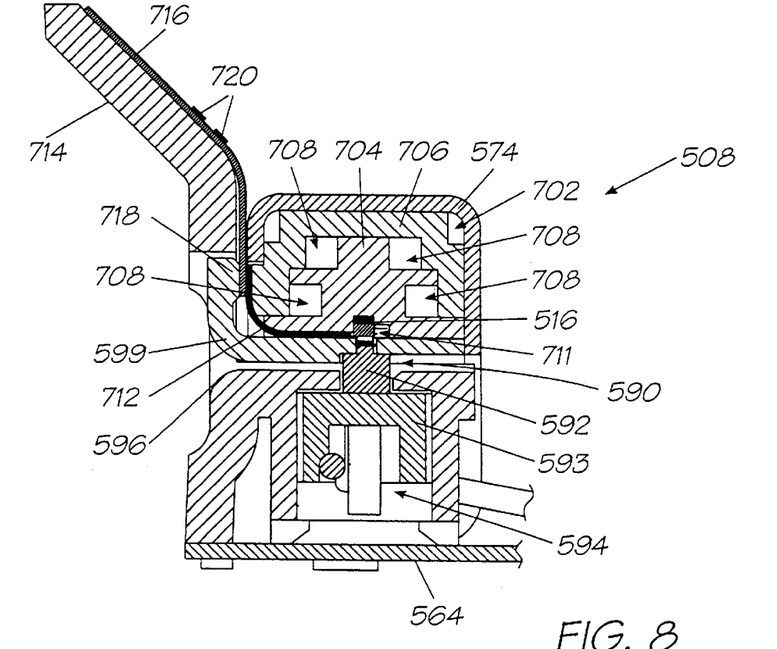
FIG. 8 shows a sectional end view of the printhead sub-assembly with a capping mechanism in a capping position.
Figure 9:
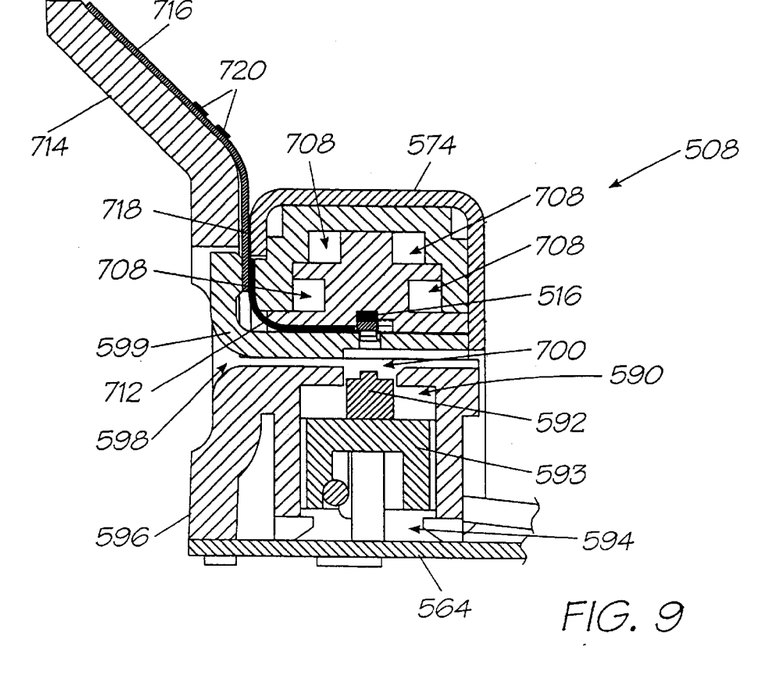
FIG. 9 shows the printhead sub-assembly with the capping mechanism in its uncapped position.

An air supply channel 711 (FIG. 8) is defined in the spine portion 704, alongside the printhead 516.

Electrical signals are provided to the printhead 516 via a TAB film 712 which is held captive between the insert 599 and the ink feed arrangement 702.

The molding 596 includes an angled wing portion 714. A flexible printed circuit board (PCB) 716 is supported on and secured to the wing portion 714. The flex PCB 716 makes electrical contact with the TAB film 712 by being urged into engagement with the TAB film 712 via a rib 718 of the insert 599. The flex PCB 716 supports busbars 720 thereon. The busbars 720 provide power to the printhead 516 and to the other powered components of the print engine 500. Further, a camera print engine control chip 721 is supported on the flex PCB 716 together with a QA chip (not shown) which authenticates that the cartridge 504 is compatible and compliant with the print engine 500. For this purpose, the PCB 716 includes contacts 723, which engage contacts 725 in the print cartridge 504.

Figure 7:
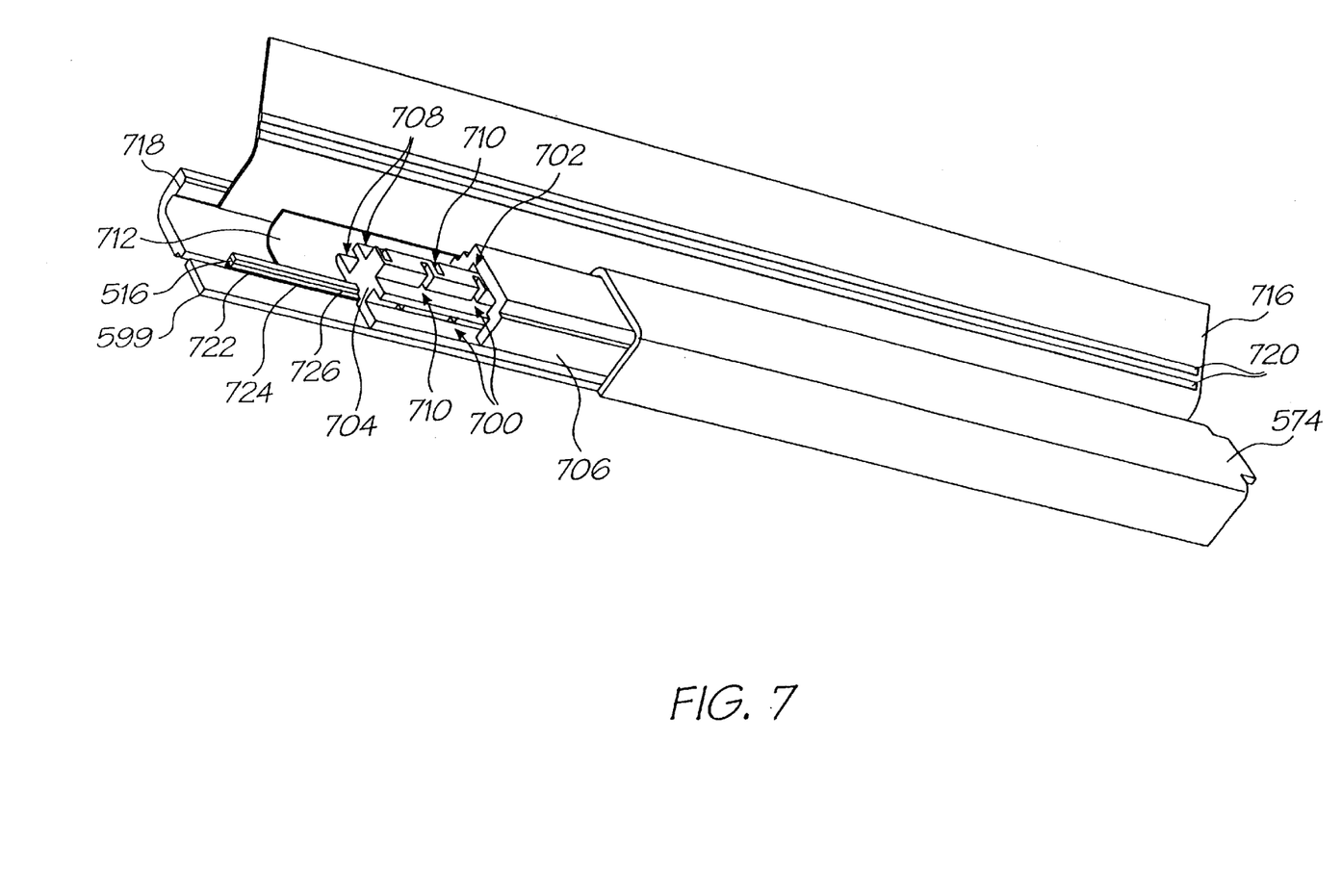
FIG. 7 shows a partly cutaway view of the printhead sub-assembly.

As illustrated more clearly in FIG. 7 of the drawings, the printhead itself includes a nozzle guard 722 arranged on a silicon wafer 724. The ink is supplied to a nozzle array (not shown) of the printhead 516 via an ink supply member 726. The ink supply member 726 communicates with outlets of the passages 710 of the ink feed arrangement 702 for feeding ink to the array of nozzles of the printhead 516, on demand.

Figure 10:
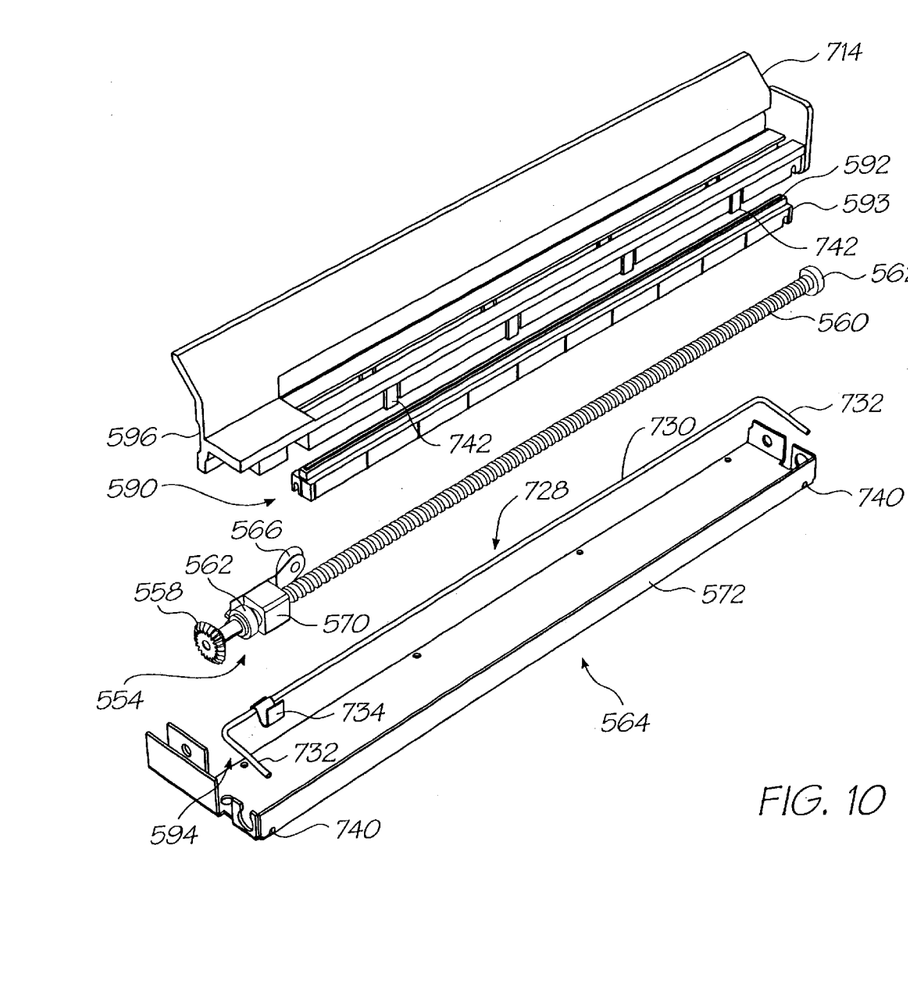
FIG. 10 shows a three dimensional, exploded view of part of the printhead sub-assembly showing the capping mechanism in greater detail.
Figure 14:
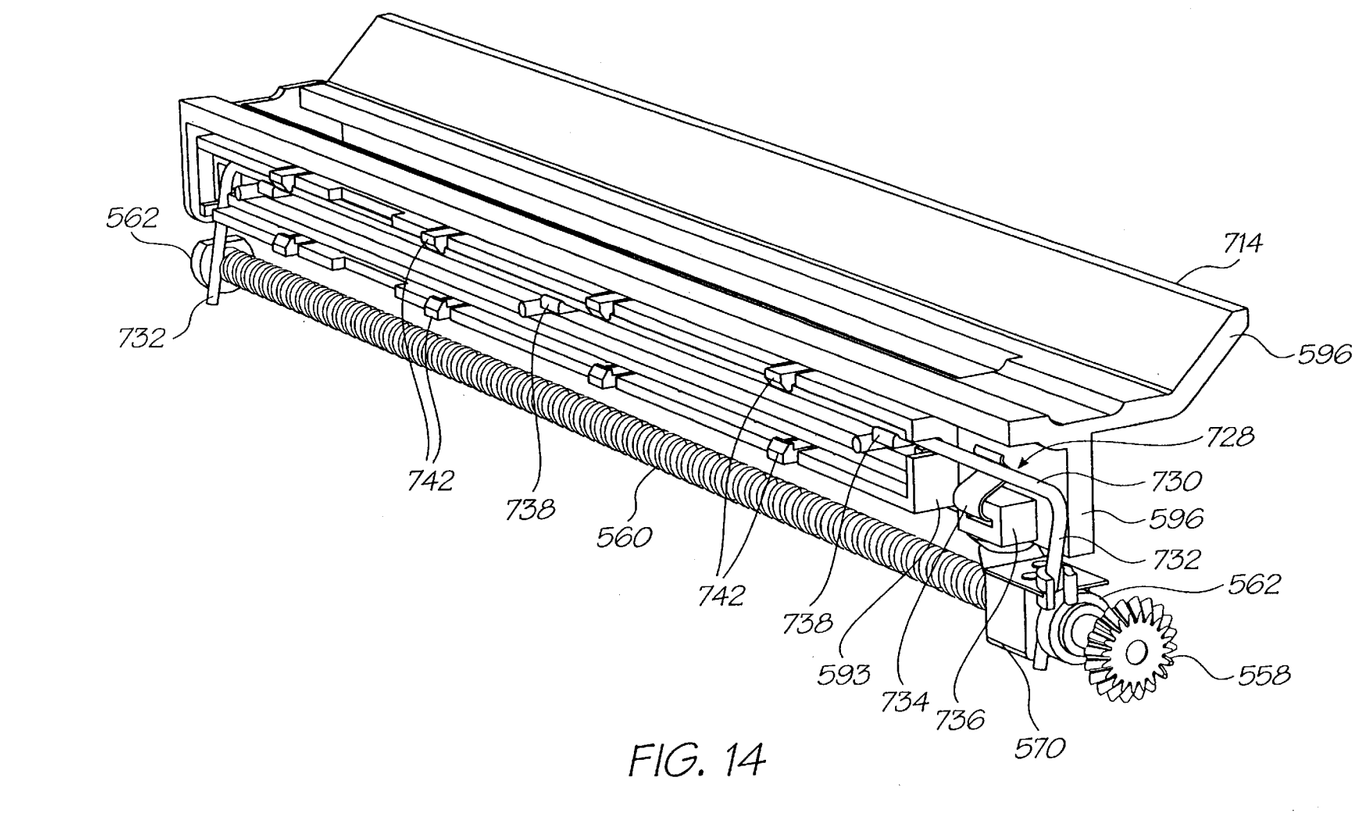
FIG. 14 shows a three dimensional view, from below, of the part of the printhead sub-assembly with the capping mechanism in its capping position.
Figure 15:
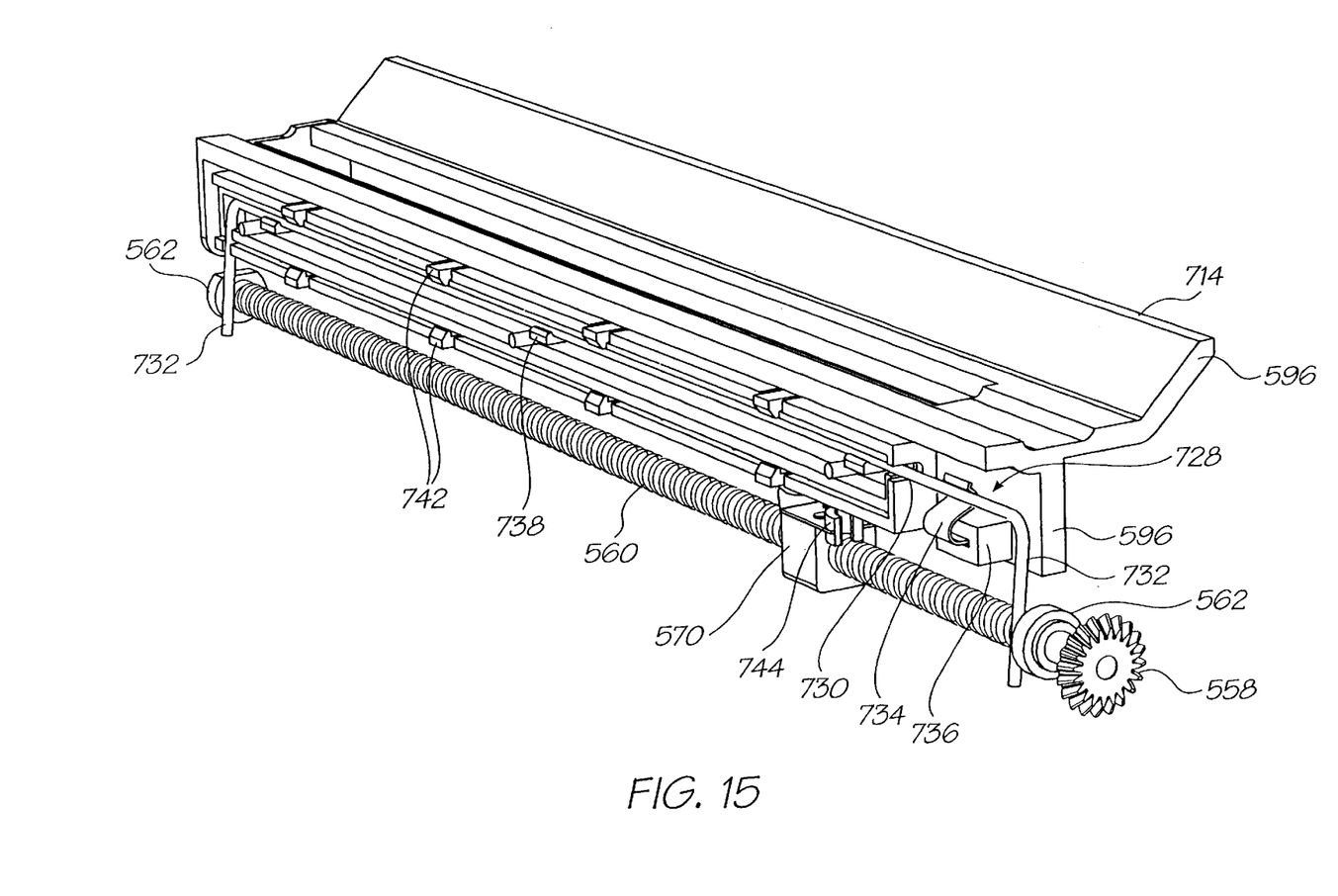
FIG. 15 shows a three dimensional view, from below, of the part of the printhead sub-assembly with the capping mechanism in its uncapped position.

Referring now to FIG. 10 of the drawings, the displacement mechanism 594 for the capping mechanism 590 is described in greater detail. The displacement mechanism 594 includes a torsion bar arrangement 728 comprising a bar 730 and a pair of arms 732. One arm 732 extends from each end of the bar 730 at right angles to the bar 730. The displacement mechanism further includes a biasing means in the form of a leaf spring 734. As shown in greater detail in FIGS. 14 and 15 of the drawings, the leaf spring 734 projects from, and is secured to, a securing member 736 forming part of the molding 596. Also, as shown most clearly in FIGS. 14 and 15 of the drawings, the bar 730 of the torsion bar is held captive by clips 738 in the carrier 593 of the capping mechanism 590. It is also to be noted that the carrier 593, itself, is held slidably captive with respect to the molding 596 by means of clip 742.

The torsion bar arrangement 728 is further located in position with reference to the metal base plate 564 by having free ends of the arm 732 received in openings 740 in the base plate 564.

Figure 11:
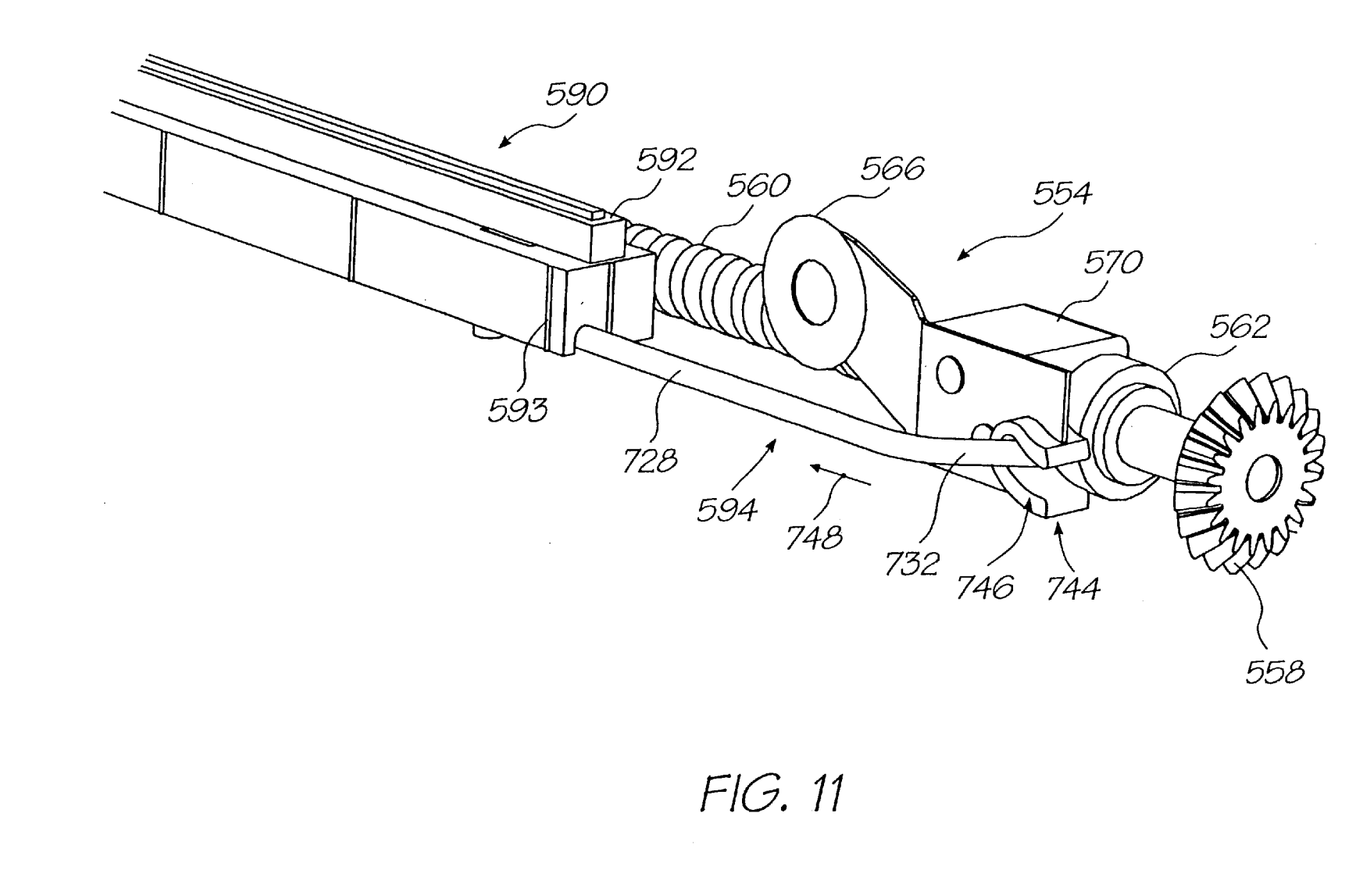
FIG. 11 shows a three dimensional, schematic view of part of the capping mechanism, in its capping position.
Figure 12:
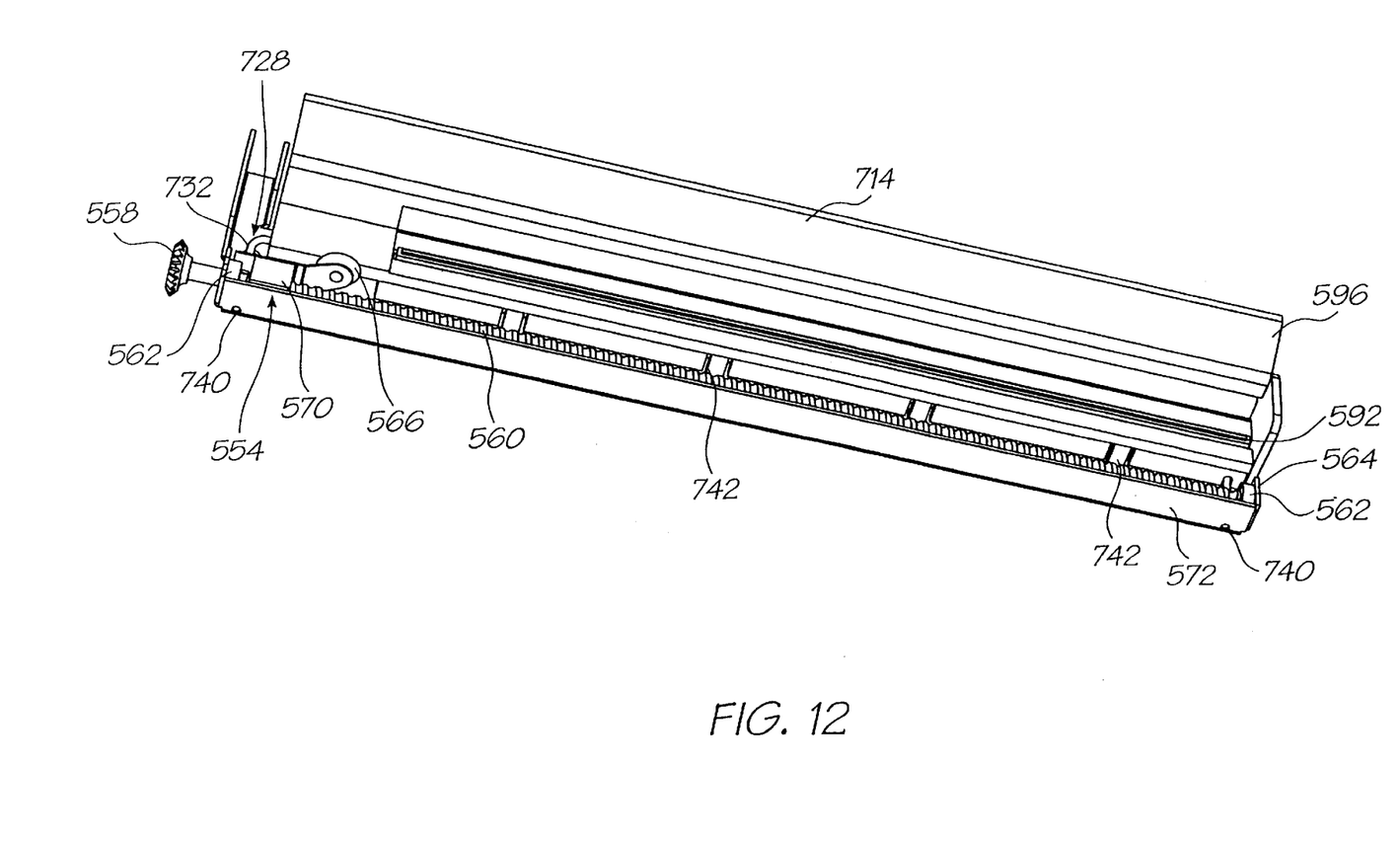
FIG. 12 shows a three dimensional view, from above, of part of the printhead sub-assembly with the capping mechanism in its capping position.
Figure 13:
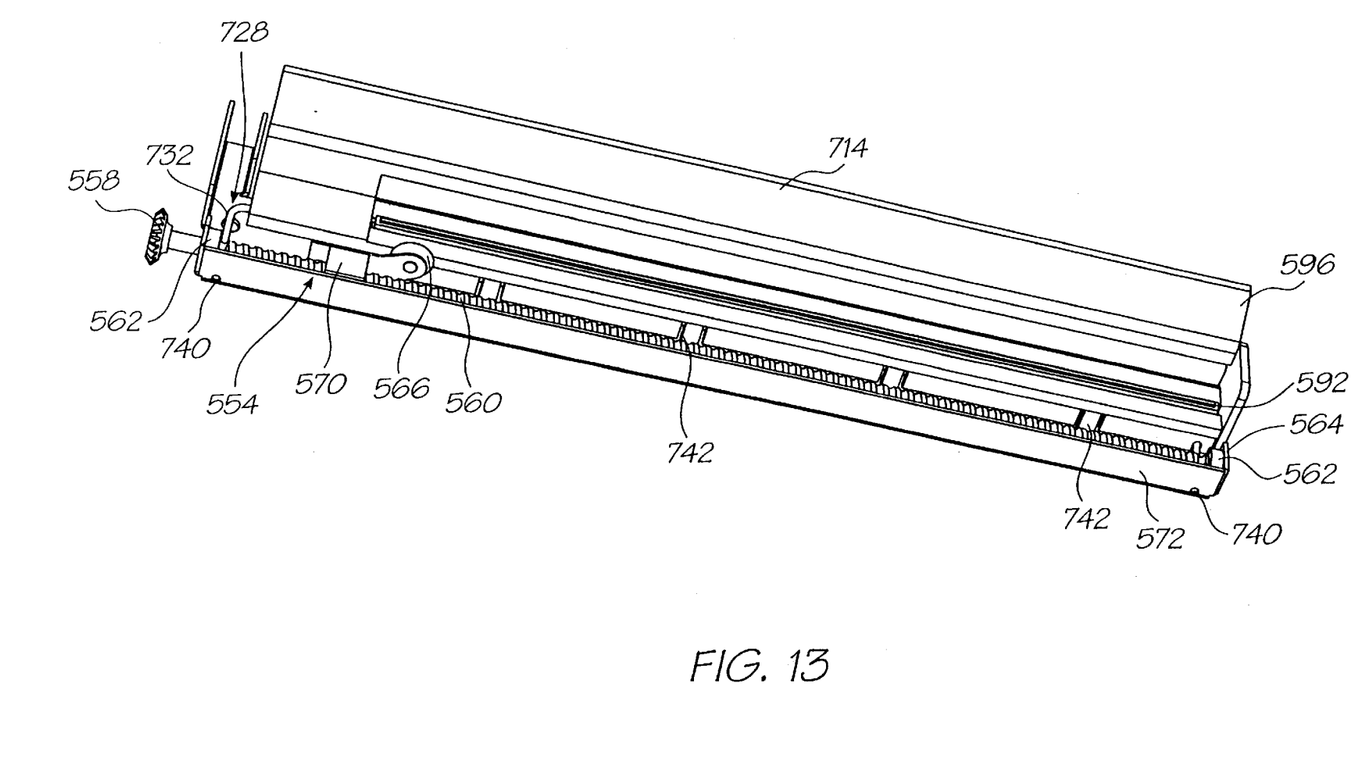
FIG. 13 shows a three dimensional view, from above, of the part of the printhead sub-assembly with the capping mechanism in its uncapped position.

The mounting block 570 of the cutter assembly 554 carries a cam member or cam profile 744 having a ramped region 746. When the mounting block 570 of the cutter assembly 554 moves to its parked position, as shown in FIG. 11 of the drawings, one of the arms 732 of the torsion bar arrangement 728 is received within the cam profile 744 and is urged upwardly, against the action of the leaf spring 734, such that the rib 592 of the capping mechanism 590 is urged into abutment with the printhead 516.

Conversely, when it is desired to print using the printhead, the mounting block 570 is moved in the direction of arrow 748 (FIG. 11) so that the arm 732 of the torsion bar arrangement 728 moves out of the cam profile 744. The leaf spring 734 then acts on the bar 730 of the torsion bar arrangement 728 urging the rib 592 of the capping mechanism 590 out of abutment with the printhead 516. This allows the print media 542 to pass through the slot 598 beneath the printhead 516 so that printing can take place.

It will be appreciated that the displacement mechanism 594 is entirely mechanical in operation. Accordingly, it is not a drain on a power source of a camera in which the print engine 500 is used.

It is also to be noted that, in order to make the print engine 500 more compact, the size of the print engine assembly 502 is such that most of the components are received within a footprint of an end of the print cartridge 504.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A print engine having a printing condition and a non-printing condition and including a printhead for printing on a print medium passing the printhead when the engine is in the printing condition, the engine comprising:
   a printhead cover movable between
      a first position, spaced from the printhead when the engine is in said printing condition, to allow the printhead to print on a said medium;
      a second position when the engine is in said non-printing condition, in which the cover abuts the printhead; and
   a cutter mechanism which is movable relative to the printhead for cutting off successive parts of a said medium that passes the printhead, the cutter mechanism being configured, when moving relative to the printhead, to move the cover from the first position into the second position.

2. The engine of claim 1 comprising a rotatable worm gear, the cutter mechanism being configured to travel along the gear when the gear rotates, into an actuating position, and when travelling into the actuating position, to move the cover from the first position into the second position.

3. The engine of claim 2 wherein the cutter mechanism comprises a cutting wheel and a block on which the wheel is mounted, the block being configured for engagement with the gear so as to travel therealong on rotation of the gear.

4. The engine of claim 3 wherein the cutter mechanism defines a cam surface configured for effecting said movement of the cover from the first position into the second position when the cutter mechanism moves into said actuating position.

5. The engine of claim 4 comprising an actuator, wherein said cam surface is configured to engage the actuator when the cutter mechanism moves into said actuating position, thereby to move the actuator such that the actuator moves the cover from the first position into the second position.

6. The engine of claim 5 wherein the actuator is in the form of an elongate bar.

7. The engine of claim 6 comprising a forcing element configured for exerting a force on the actuator to urge the cover towards said first position, the actuator being configured, when engaged by the cam surface, to move the cover against said force into said second position.

8. The engine of claim 7 wherein said forcing element is a leaf spring.

9. The engine of claim 1 wherein the cover comprises a resiliently flexible rib configured for abutting the printhead when the cover is in the second position.

10. A print engine having a printing condition and a non-printing condition and including a printhead for printing on a print medium passing the printhead when the engine is in the printing condition, the engine comprising:
   a printhead cover movable between
      a first position, spaced from the printhead when the engine is in said printing condition, to allow the printhead to print on a said medium, and
      a second position when the engine is in said non-printing condition, in which the cover abuts the printhead;
   an actuator configured for moving the cover from the first position to the second position; and
   a cutter mechanism which is movable relative to the printhead for cutting off successive parts of a said medium that passes the printhead, the cutter mechanism being configured, when moving relative to the printhead, to move the cover from the first position into the second position.

11. The engine of claim 10 wherein the actuator is in the form of an elongate bar.

12. The print engine of claim 10 comprising a forcing element configured for exerting a force on the actuator to urge the cover towards said second position, the actuator being configured, when the print engine is in the non-printing condition, to hold the cover against said force in said second position.

13. The engine of claim 12 wherein said forcing element is a leaf spring.

14. The engine of claim 10 wherein the cover comprises a resiliently flexible rib configured for abutting the printhead when the cover is in the second position.

* * * * *